US008780509B2

(12) United States Patent
Wang

(10) Patent No.: US 8,780,509 B2
(45) Date of Patent: Jul. 15, 2014

(54) CIRCUIT PROTECTION DEVICE AND PROTECTION METHOD

(75) Inventor: Te-Wei Wang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 105 days.

(21) Appl. No.: 13/238,694

(22) Filed: Sep. 21, 2011

(65) Prior Publication Data

US 2012/0257310 A1 Oct. 11, 2012

(30) Foreign Application Priority Data

Apr. 6, 2011 (TW) .............................. 100111776 A

(51) Int. Cl.
*H02H 9/00* (2006.01)
(52) U.S. Cl.
USPC ........................................................ 361/18
(58) Field of Classification Search
USPC ........................................................ 361/18
See application file for complete search history.

(56) References Cited

U.S. PATENT DOCUMENTS

| | | | | |
|---|---|---|---|---|
| 4,065,642 A * | 12/1977 | McClure | .......................... | 379/77 |
| 4,896,089 A * | 1/1990 | Kliman et al. | ................. | 318/701 |
| 6,646,426 B2 * | 11/2003 | Terashi | .......................... | 323/285 |
| 6,903,912 B2 * | 6/2005 | Kranister et al. | ............ | 361/93.9 |
| 2002/0029035 A1 * | 3/2002 | Lee et al. | ........................ | 606/32 |
| 2002/0135345 A1 | 9/2002 | Terashi | | |
| 2005/0264970 A1 * | 12/2005 | Shinobu | ....................... | 361/93.1 |

FOREIGN PATENT DOCUMENTS

CN 1441992 A 9/2003

* cited by examiner

*Primary Examiner* — Jared Fureman
*Assistant Examiner* — Kevin J Comber
(74) *Attorney, Agent, or Firm* — Muncy, Geissler, Olds & Lowe, P.C.

(57) ABSTRACT

A circuit protection device is applied to a power supply module. The circuit protection device includes a judgment module and a control module. The judgment module includes a comparing unit, a feedback unit and a reset unit. The comparing unit has an output terminal, a first input terminal and a second input terminal. The feedback unit is electrically connected to the output terminal and the first input terminal. The reset unit is electrically connected to the feedback unit and the first input terminal. The control module is electrically connected to the comparing unit and the reset unit of the judgment module. The comparing unit receives a first reference signal representing the output current of the power supply module and a second reference signal representing the output voltage of the power supply module, and outputs a judgment signal to the control module.

14 Claims, 9 Drawing Sheets

CIRCUIT PROTECTION DEVICE AND PROTECTION METHOD

CROSS REFERENCE TO RELATED APPLICATIONS

This Non-provisional application claims priority under 35 U.S.C. §119(a) on Patent Application No(s). 100111776 filed in Taiwan, Republic of China on Apr. 6, 2011, the entire contents of which are hereby incorporated by reference.

BACKGROUND OF THE INVENTION

1. Field of Invention

The present invention relates to a circuit protection device and protection method.

2. Related Art

The power supplier, such as the power converter or charger, is used to apply a stable voltage and/or current to a load. In order to provide a safety and qualified operation environment for the user and the electronic apparatus, a circuit protection device is configured in the power supplier. Accordingly, when the short circuit or over current is happened, the circuit protection device can limit the output power of the power supplier, and may further cease the operation of the power supplier. This function can prevent the permanent damage of the power supplier and the load connected with the power supplier.

As shown in FIG. 1A, a conventional circuit protection device 1 directly uses an operational amplifier to detect the current for determining whether the over current or short circuit happens or not. Although the conventional circuit protection device 1 has simple circuit design, it is not suitable for the power supplier with the rated output of a large current. In details, the threshold for enabling the conventional circuit protection device 1 is a constant value, and the circuit protection device 1 will be enabled after the over current excesses the threshold. Accordingly, for the power supplier with the rated output of a large current (e.g. larger than 150 A), the internal components of the power supplier and the load connected to the power supplier have been burdened with a huge stress before the enablement of the circuit protection device 1.

FIG. 1B is a schematic graph showing the waveform while the circuit protection device 1 is enabled, wherein the circuit protection device 1 is configured in a power supplier with the rated output current of 150 A. If the internal components of the power supplier or the load are malfunctioned (e.g. short circuit) before the power supplier starts to operate, the start current $C_S$ of the power supplier is an instantaneous large current. Besides, since the circuit protection device 1 is enabled after the start current $C_S$ reaches the threshold T, the components and load may be damaged due to the start current $C_S$, which excesses the rated spec. This damage may further cause the danger of the user. In other words, in the power supplier with the conventional circuit protection device 1, the internal components and the load may be impacted by the larger stress, so that they are easily damaged and have shortened lifetime.

In addition, since the conventional circuit protection device 1 usually has simple circuit design, it does not have the latch and reset functions. This design restricts the application of the circuit protection device 1.

Therefore, it is an important subject of the invention to provide a circuit protection device and protection method that can decrease the threshold for enabling the protection function, so that the circuit protection device can fast respond to protect the power supplier, thereby minimizing the damage of the internal components and improving the reliability and utility.

SUMMARY OF THE INVENTION

In view of the foregoing subject, an objective of the present invention is to provide a circuit protection device and protection method that can decrease the threshold for enabling the protection function, so that the circuit protection device can fast respond to protect the power supplier, thereby minimizing the damage of the internal components and improving the reliability and utility.

To achieve the above objective, the present invention discloses a circuit protection device, which is applied to a power supply module. The circuit protection device includes a judgment module and a control module. The judgment module includes a comparing unit, a feedback unit and a reset unit. The comparing unit has an output terminal, a first input terminal and a second input terminal. The feedback unit is electrically connected to the output terminal and the first input terminal. The reset unit is electrically connected to the feedback unit and the first input terminal. The control module is electrically connected to the comparing unit and the reset unit of the judgment module. The comparing unit receives a first reference signal representing the output current of the power supply module and a second reference signal representing the output voltage of the power supply module, and outputs a judgment signal to the control module.

In one embodiment of the invention, the comparing unit is a comparator, the first input terminal is a non-inverting input terminal, and the second input terminal is an inverting input terminal.

In one embodiment of the invention, the feedback unit includes a diode and a resistor connected to each other in series.

In one embodiment of the invention, the judgment module further includes a first resistor and a second resistor. The first resistor is electrically connected to the first input terminal of the comparing unit. The second resistor is electrically connected to the second input terminal of the comparing unit. The resistance value of the resistor of the feedback unit is sufficiently smaller than that of the first resistor.

In one embodiment of the invention, the circuit protection device further includes a reference signal generating module for outputting the first reference signal and the second reference signal to the comparing unit of the judgment module. The reference signal generating module further includes a first comparing circuit and a second comparing circuit. The first comparing circuit, which includes a first comparator, is electrically connected to the first input terminal of the comparing unit and outputs the first reference signal. The second comparing circuit, which includes a second comparator, is electrically connected to the second input terminal of the comparing unit and outputs the second reference signal.

In one embodiment of the invention, the second comparing circuit further includes a current limiter and a resistor divider. One end of the current limiter is electrically connected to the second comparator. One end of the resistor divider is electrically connected to the other end of the current limiter and the second input terminal of the comparing unit. The other end of the resistor divider is grounded.

In one embodiment of the invention, the reset unit has a first terminal, a second terminal, and a third terminal. The first terminal of the reset unit is electrically connected to the feedback unit and the first input terminal. The second terminal of the reset unit is electrically connected to the control module. The third terminal of the reset unit is grounded.

In one embodiment of the invention, the control module outputs a control signal to the power supply module according to the judgment signal.

In one embodiment of the invention, the control module outputs a reset signal to the reset unit.

To achieve the above objective, the present invention also discloses a protection method applied to a circuit protection device and a power supply module. The circuit protection device includes a judgment module and a control module, and the judgment module includes a comparing unit, a feedback unit and a reset unit. The protection method includes the following steps of: determining whether a first reference signal is larger than a second reference signal by the comparing unit, wherein the first reference signal represents the output current of the power supply module, and the second reference signal represents the output voltage of the power supply module; if the comparing unit determines that the first reference signal is larger than the second reference signal, outputting a high-level judgment signal by the comparing unit; outputting a feedback signal from the feedback unit to the comparing unit to allow the comparing unit to continuously output the high-level judgment signal; and outputting a control signal from the control module to the power supply module according to the high-level judgment signal.

In one embodiment of the invention, the protection method further includes the steps of: if the comparing unit determines that the first reference signal is not larger than the second reference signal, outputting a low-level judgment signal by the comparing unit; and determining again whether the first reference signal is larger than the second reference signal by the comparing unit.

In one embodiment of the invention, the protection method further includes the steps of outputting a reset signal from the control module to the reset unit; and outputting a low-level judgment signal by the comparing unit.

As mentioned above, in the circuit protection device of the invention, the comparing unit of the judgment module outputs a judgment signal according to the first reference signal representing the output current of the power supply module and a second reference signal representing the output voltage of the power supply module, and the feedback unit can maintain the protection state accordingly. This can decrease the threshold for enabling the protection function, so that the circuit protection device can fast respond to protect the power supply module, thereby minimizing the damage of the internal components and improving the reliability and utility.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
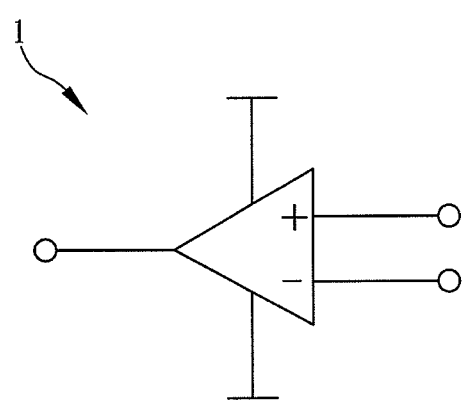
FIG. 1A is a schematic diagram showing a conventional circuit protection device.
Figure 1B:
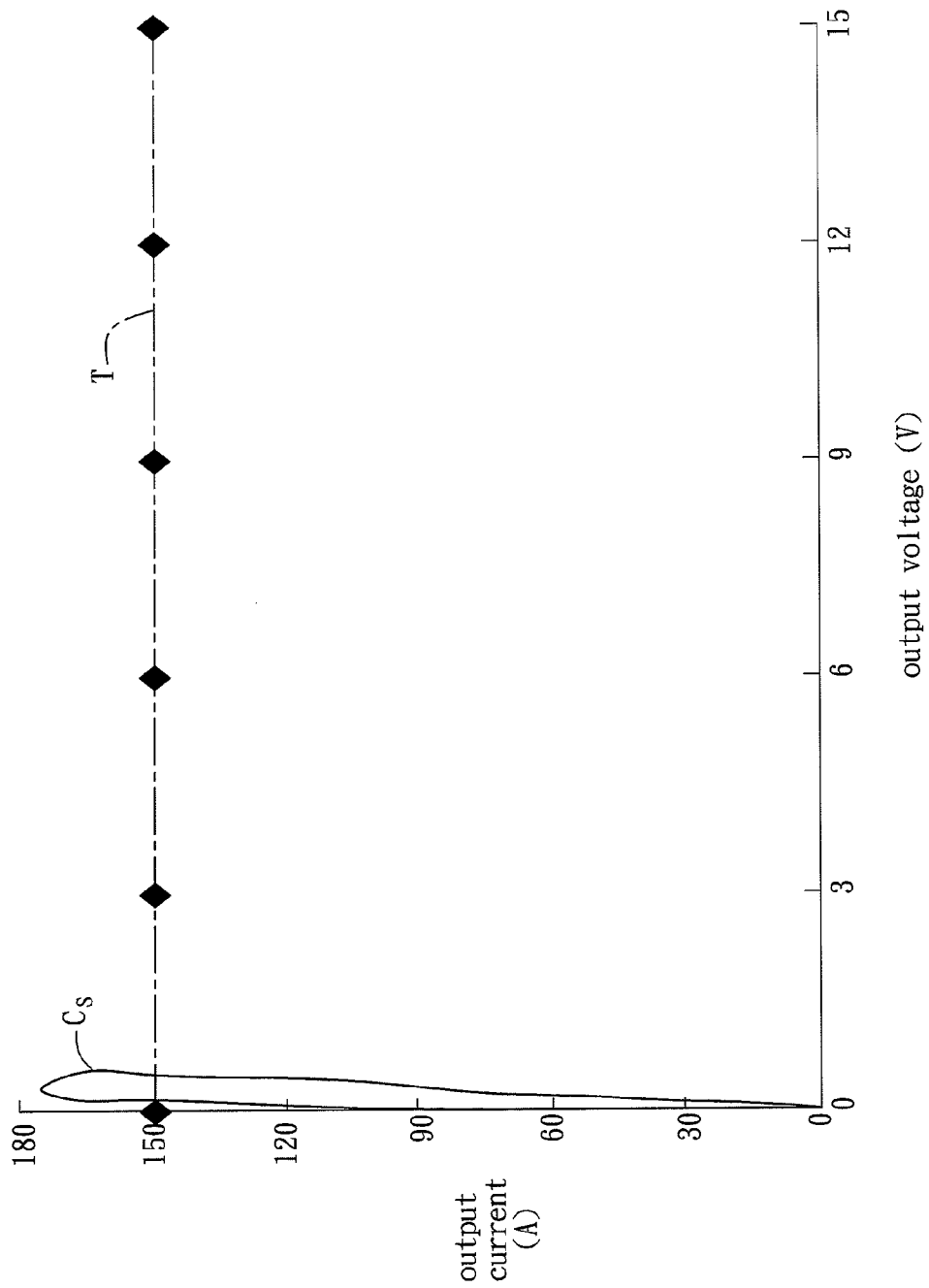
FIG. 1B is a schematic graph showing the waveform while the conventional circuit protection device is enabled.
Figure 2:
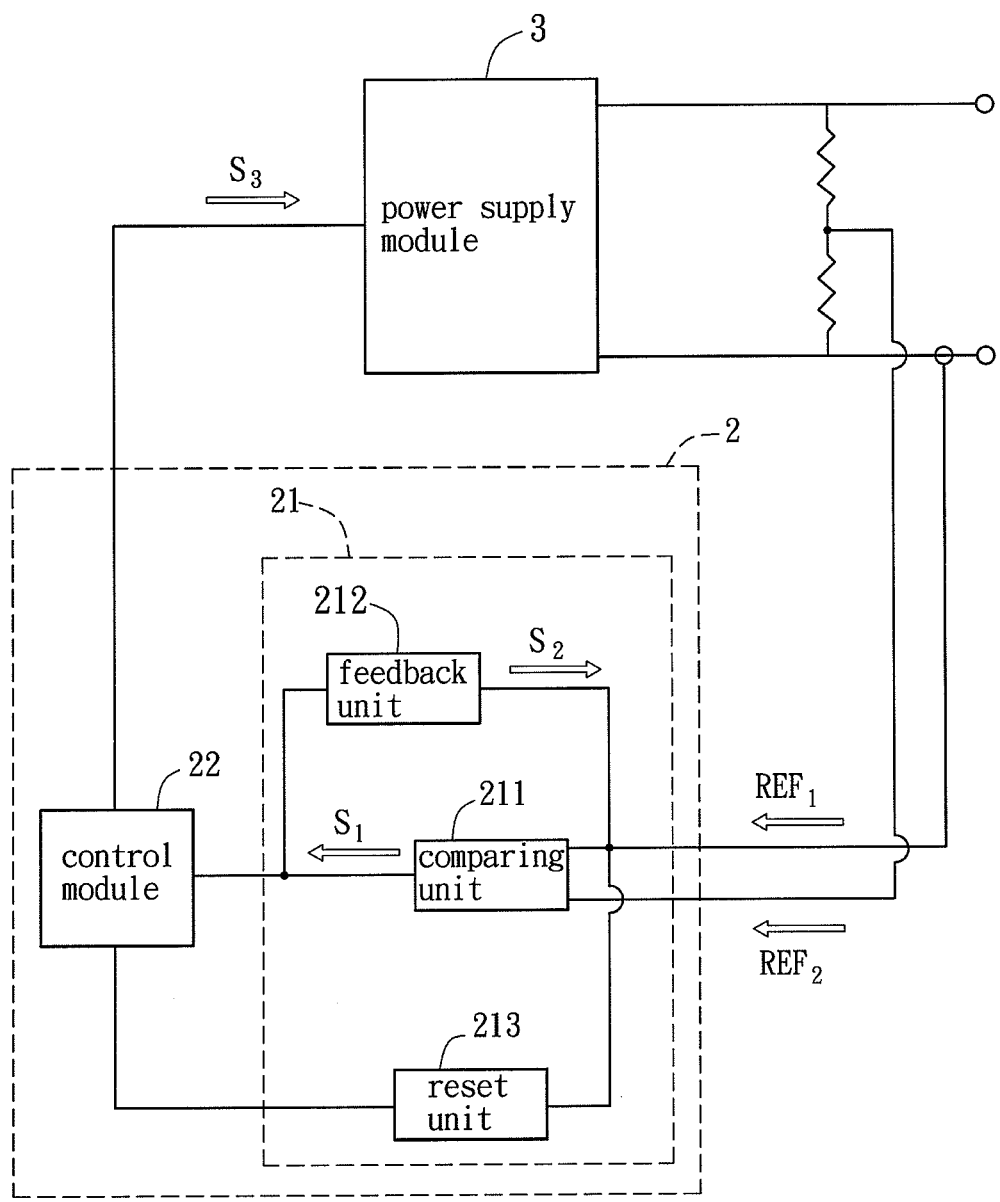
FIG. 2 is a schematic diagram showing a circuit protection device according to an embodiment of the invention.

FIG. 2 is a schematic diagram showing a circuit protection device 2 according to an embodiment of the invention. Reference to FIG. 2, the circuit protection device 2, which is applied to a power supply module 3, includes a judgment module 21 and a control module 22.

The judgment module 21 includes a comparing unit 211, a feedback unit 212, and a reset unit 213. In the embodiment, the comparing unit 211 has an output terminal, a first input terminal and a second input terminal. The first and second input terminals of the comparing unit 211 are electrically connected to the output terminal of the power supply module 3. The first input terminal of the comparing unit 211 receives a first reference signal $REF_1$ representing the output current of the power supply module 3, and the second input terminal of the comparing unit 211 receives a second reference signal $REF_2$ representing the output voltage of the power supply module 3. The comparing unit 211 compares the first reference signal $REF_1$ with the second reference signal $REF_2$. Then, the output terminal of the comparing unit 211 outputs a judgment signal $S_1$ according to the comparing result.

The feedback unit 212 is electrically connected to the output terminal and the first input terminal of the comparing unit 211. The feedback unit 212 receives the judgment signal $S_1$ from the comparing unit 211 and accordingly generates a feedback signal $S_2$. Then, the feedback unit 212 outputs the feedback signal $S_2$ to the first input terminal of the comparing unit 211. The reset unit 213 is electrically connected to the feedback unit 212 and the first input terminal of the comparing unit 211.

The control module 22 is electrically connected to the power supply module 3 and the comparing unit 211 of the judgment module 21. Accordingly, the control module 22 receives the judgment signal $S_1$ from the output terminal of the comparing unit 211, and then outputs a control signal $S_3$ to the power supply module 3. In practice, the control module 22 can be a controller or a microprocessor.

Figure 3A:
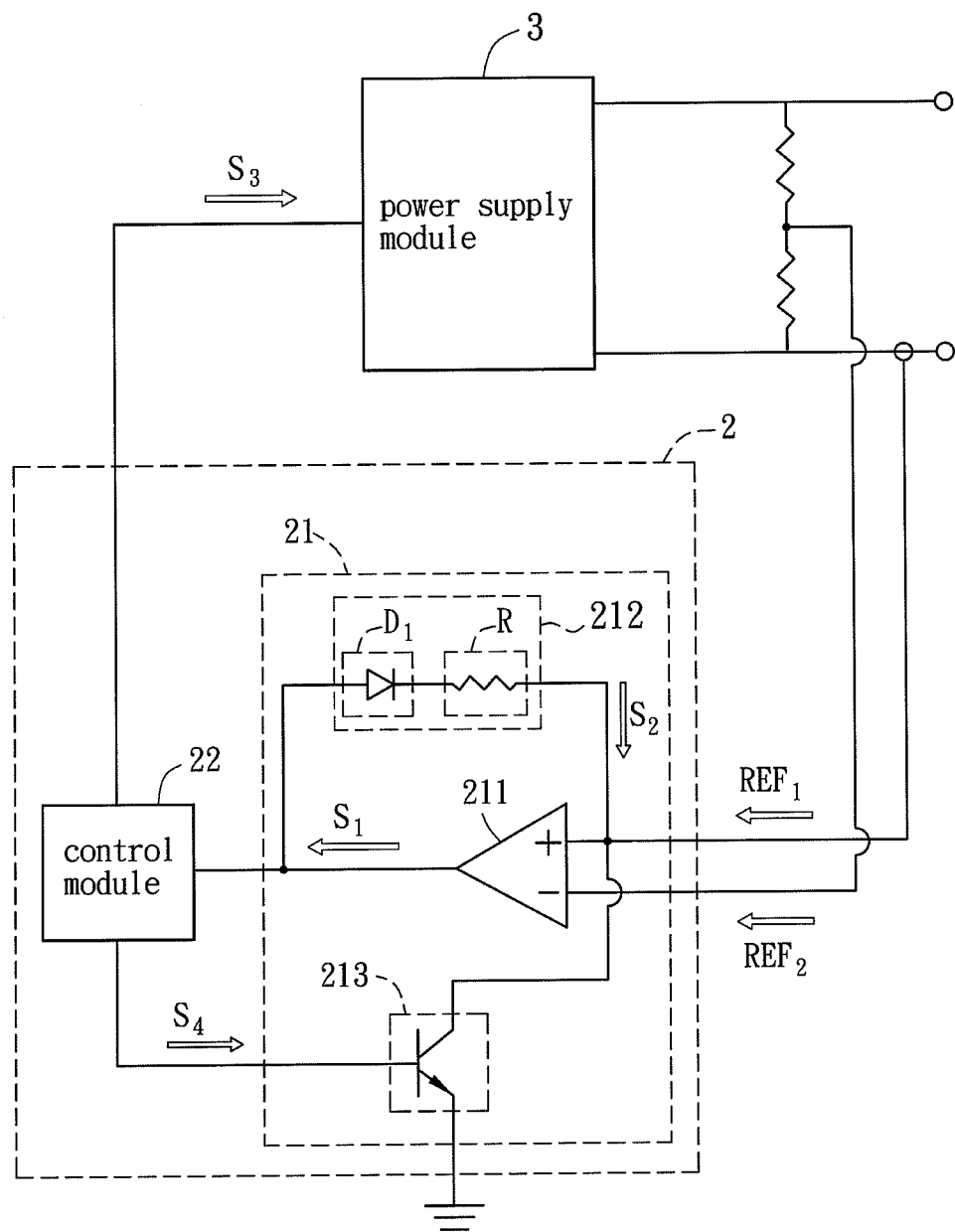
FIG. 3A is a schematic diagram showing a circuit protection device according to an embodiment of the invention.

The circuit protection device 2 of the invention will be described in details hereinafter with reference to FIGS. 3A and 3B. In this embodiment, the comparing unit 211 of the judgment module 21 is a comparator. The first input terminal is a non-inverting input terminal, and the second input terminal is an inverting input terminal.

The feedback unit 212 of the judgment module 21 includes a diode $D_1$ and a resistor R, which are connected to each other in series. The reset unit 213 has a first terminal, a second terminal, and a third terminal. In this embodiment, the reset unit 213 is an NPN transistor, wherein the first terminal thereof is a collector, the second terminal is a base, and the second terminal is an emitter. The first terminal of the reset unit 213 is electrically connected to the feedback unit 212 and the first input terminal of the comparing unit 211. The second terminal of the reset unit 213 is electrically connected to the control module 22. The third terminal of the reset unit 213 is grounded.

In practice operation, the comparing unit 211 of the judgment module 21 compares the received first reference signal $REF_1$ with a second reference signal $REF_2$. Herein, the first reference signal $REF_1$ represents the output current of the power supply module 3, and the second reference signal $REF_2$ represents the output voltage of the power supply module 3. When the value of the first reference signal $REF_1$ is larger than that of the second reference signal $REF_2$, it means that the short circuit or over current happens. In this case, the comparing unit 211 outputs a high-level judgment signal $S_1$ to the control module 22. Then, the control module 22 outputs the control signal $S_3$ according to the judgment signal $S_1$ for ceasing the operation of the power supply module 3. In other words, the protection function of the circuit protection device 2 is enabled based on detecting the relationship between the output current and output voltage of the power supply module 3.

Figure 3B:
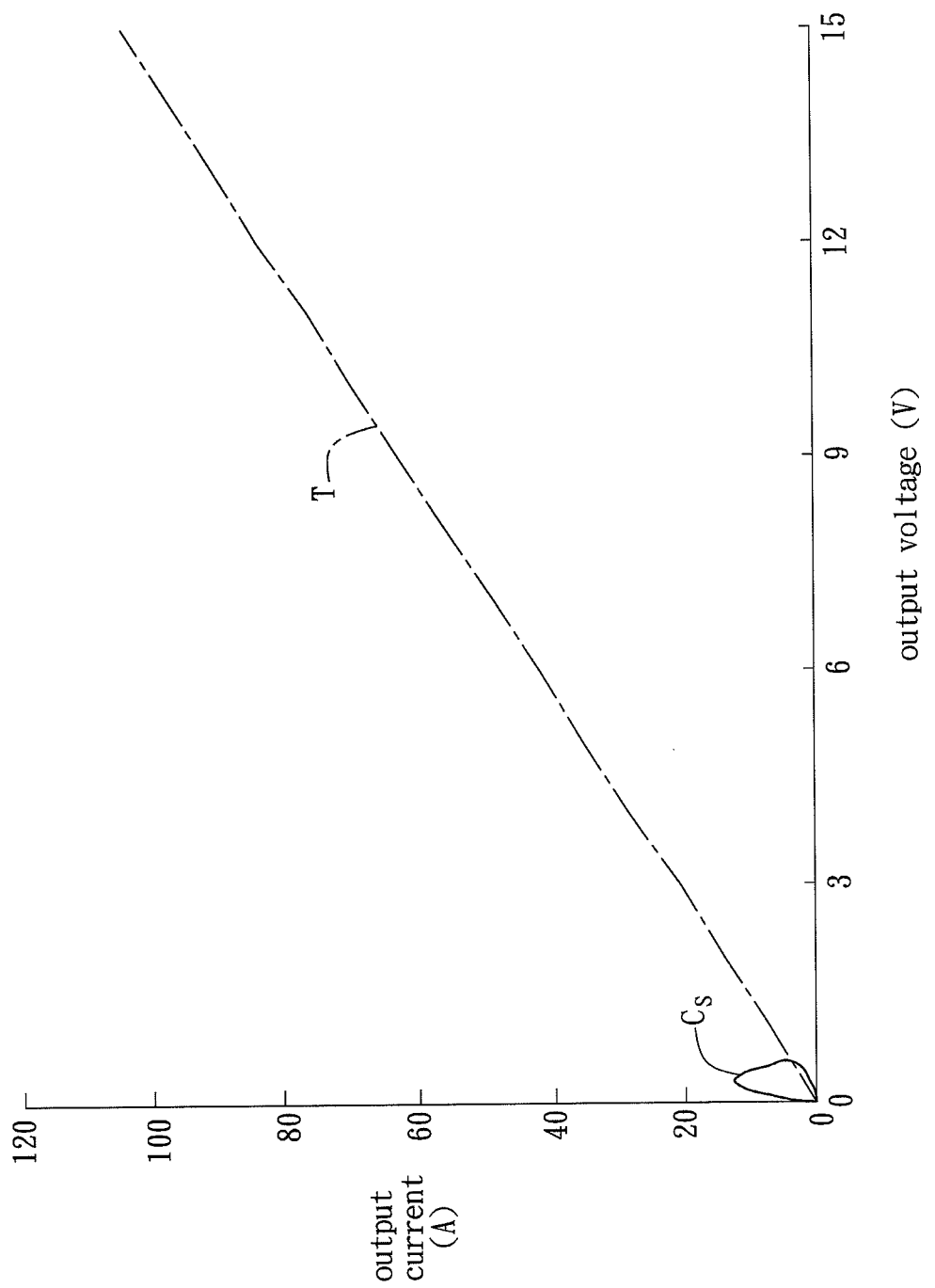
FIG. 3B is a schematic graph showing the waveform while the circuit protection device according to the embodiment of the invention is enabled.

For example, the power supply module 3 is a power supplier with a rated output voltage of 13.5V and a rated output current of 35 A, and FIG. 3B shows the waveform while the circuit protection device 2 is enabled. As shown in FIG. 3B, the threshold T for enabling the circuit protection device 2 is not a constant value in the prior art but a variable value depending on the output voltage of the power supply module 3. When the output voltage of the power supply module 3 is lower, the threshold T for enabling the circuit protection device 2 is also lower. Therefore, if the internal components of the power supply module 3 or the load are malfunctioned (e.g. short circuit) before the power supply module 3 starts to operate, the circuit protection device 2 can detect that the start current $C_S$ excesses the threshold T instantly at the moment of start of the power supply module 3, thereby enabling the protection immediately.

In addition, the feedback unit 212 simultaneously receives the high-level judgment signal $S_1$ from the comparing unit 211 and outputs the feedback signal $S_2$ to the first input terminal of the comparing unit 211. This can form a positive feedback and allow the feedback unit 212 in a latch state for continuously outputting the high-level judgment signal $S_1$. Moreover, the control module 22 can further output a reset signal $S_4$ to the reset unit 213 for releasing the latch state. In practice, the control module 22 can output the reset signal $S_4$ to the reset unit 213 according to a preset delay, and the reset unit 213 can accordingly perform the reset operation.

Figure 4:
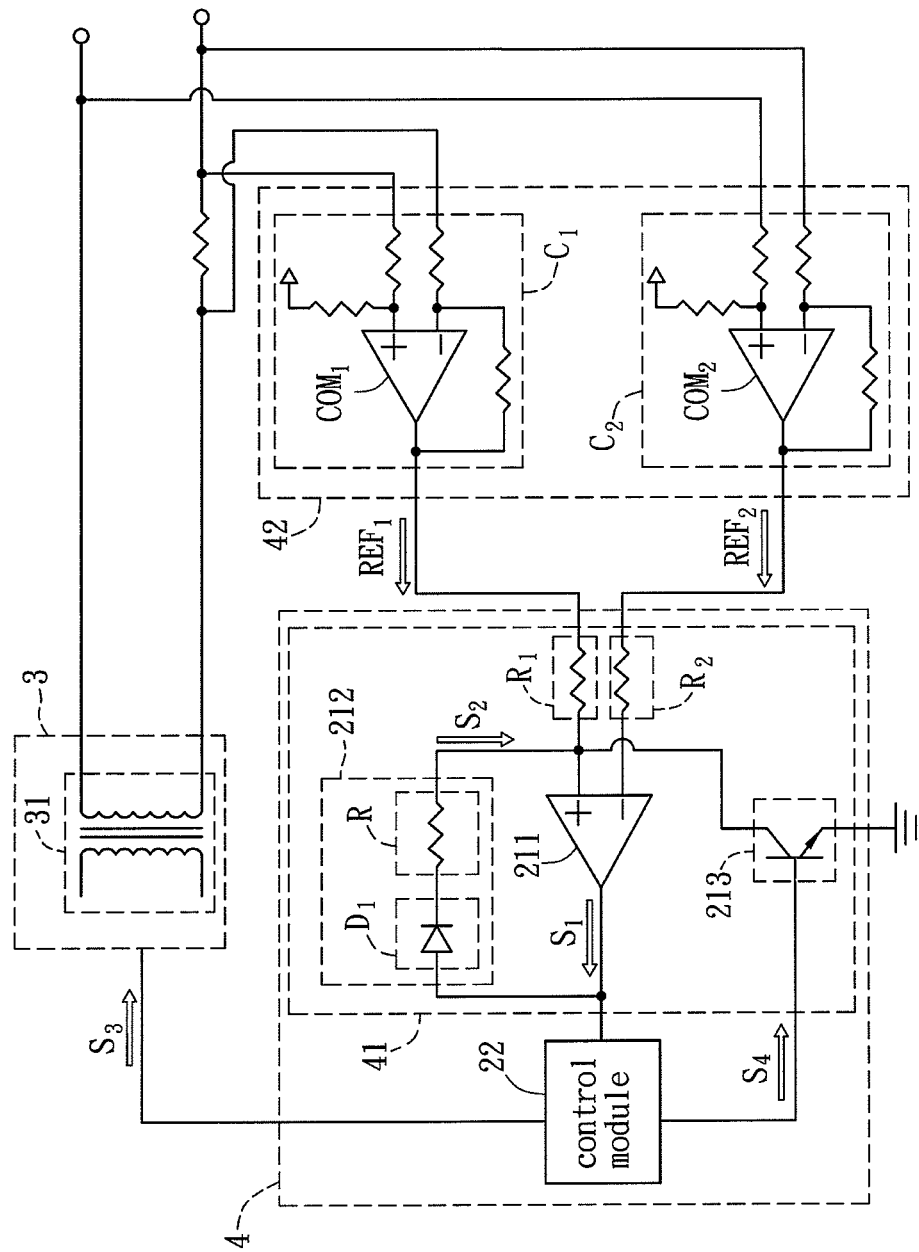
FIG. 4 is a schematic diagram showing another circuit protection device according to the embodiment of the invention.

FIG. 4 is a schematic diagram showing another circuit protection device 4 according to the embodiment of the invention. The circuit protection device 4 is applied to a power supply module 3, which includes a transformer 31. The circuit protection device 4 is different from the previous circuit protection device 2 in that the circuit protection device 4 further includes a reference signal generating module 42, and the judgment module 41 of the circuit protection device 4 further includes a first resistor $R_1$ and a second resistor $R_2$.

In this embodiment, the first resistor $R_1$ is electrically connected to the first input terminal of the comparing unit 211, and the second resistor $R_2$ is electrically connected to the second input terminal of the comparing unit 211. In practice, the resistance value of the resistor R of the feedback unit 212 is sufficiently smaller than that of the first resistor $R_1$. Preferably, the ratio of the resistance value of the resistor R to the resistance value of the first resistor $R_1$ is about 1:10.

The reference signal generating module 42 includes a first comparing circuit $C_1$ and a second comparing circuit $C_2$. In this embodiment, the first comparing circuit $C_1$ includes a first comparator $COM_1$, and the input terminal of the first comparing circuit $C_1$ is electrically connected to the secondary side of the transformer 31 of the power supply module 3 for receiving and comparing the output current of the power supply module 3. The output terminal of the first comparator $COM_1$ of the first comparing circuit $C_1$ outputs the first reference signal $REF_1$ and is electrically connected to the first input terminal of the comparing unit 211 through the first resistor $R_1$. The second comparing circuit $C_2$ includes a second comparator $COM_2$, and the input terminal of the second comparing circuit $C_2$ is electrically connected to the secondary side of the transformer 31 of the power supply module 3 for receiving and comparing the output voltage of the power supply module 3. The output terminal of the second comparator $COM_2$ of the second comparing circuit $C_2$ outputs the second reference signal $REF_2$ and is electrically connected to the second input terminal of the comparing unit 211 through the second resistor $R_2$.

In practice, each of the first comparing circuit $C_1$ and the second comparing circuit $C_2$ has a plurality of resistors. The resistors with different resistance values are optionally selected depending on the actual need for adjusting the slope of the threshold for enabling the protection. For example, the resistors with different resistance values can be selected depending on the rated output voltage and rated output current of the power supply module 3.

Figure 5A:
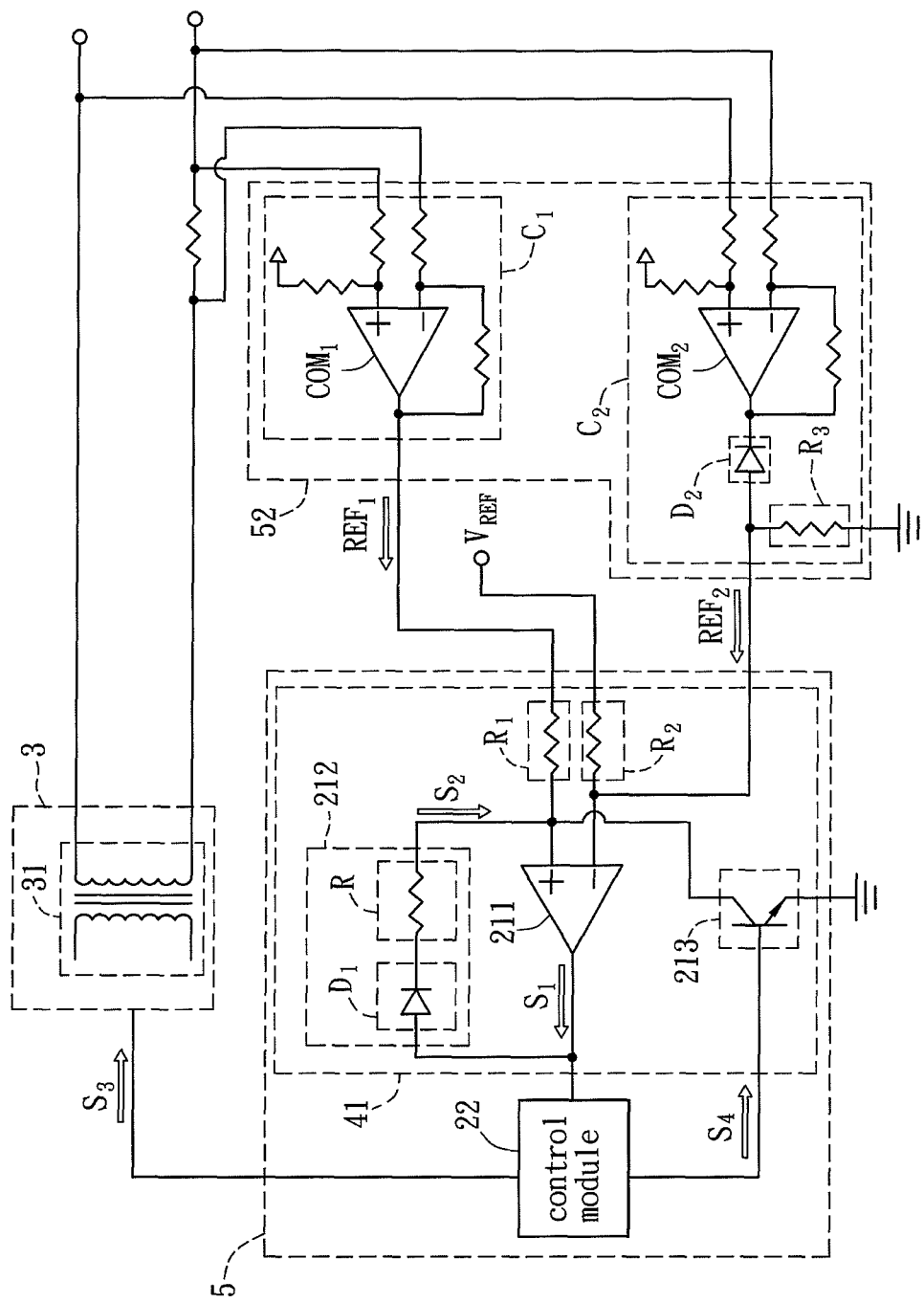
FIG. 5A is a schematic diagram showing another circuit protection device according to the embodiment of the invention.

FIG. 5A is a schematic diagram showing another circuit protection device 5 according to the embodiment of the invention. The circuit protection device 5 is different from the previous circuit protection device 4 in that the second comparing circuit $C_2$ of the reference signal generating module 52 of the circuit protection device 5 further includes a current limiter $D_2$ and a resistor divider $R_3$. Besides, one end of the second resistor $R_2$ is electrically connected to a reference voltage source $V_{REF}$.

In this embodiment, one end of the current limiter $D_2$ is electrically connected to the second comparator $COM_2$, and the other end thereof is electrically connected to the second resistor $R_2$ and the second input terminal of the comparing unit 211. One end of the resistor divider $R_3$ is electrically connected to the other end of the current limiter $D_2$ and the second input terminal of the comparing unit 211. The other end of the resistor divider $R_3$ is grounded.

In practice, the first comparing circuit $C_1$ receives and compares the output current of the power supply module 3. The output terminal of the first comparing circuit $C_1$ outputs the first reference signal $REF_1$ and is electrically connected to the first input terminal of the comparing unit 211 through the first resistor $R_1$. The input terminal of the second comparing circuit $C_2$ is electrically connected to the secondary side of the transformer 31 of the power supply module 3 for receiving and comparing the output voltage of the power supply module 3. The second resistor $R_2$ receives the reference voltage source $V_{REF}$, which is then divided by the second resistor $R_2$ and the resistor divider $R_3$. Then, the current limiter $D_2$ decreases the voltage value of the output signal from the second comparator $COM_2$ so as to generate the second reference signal $REF_2$.

Figure 5B:
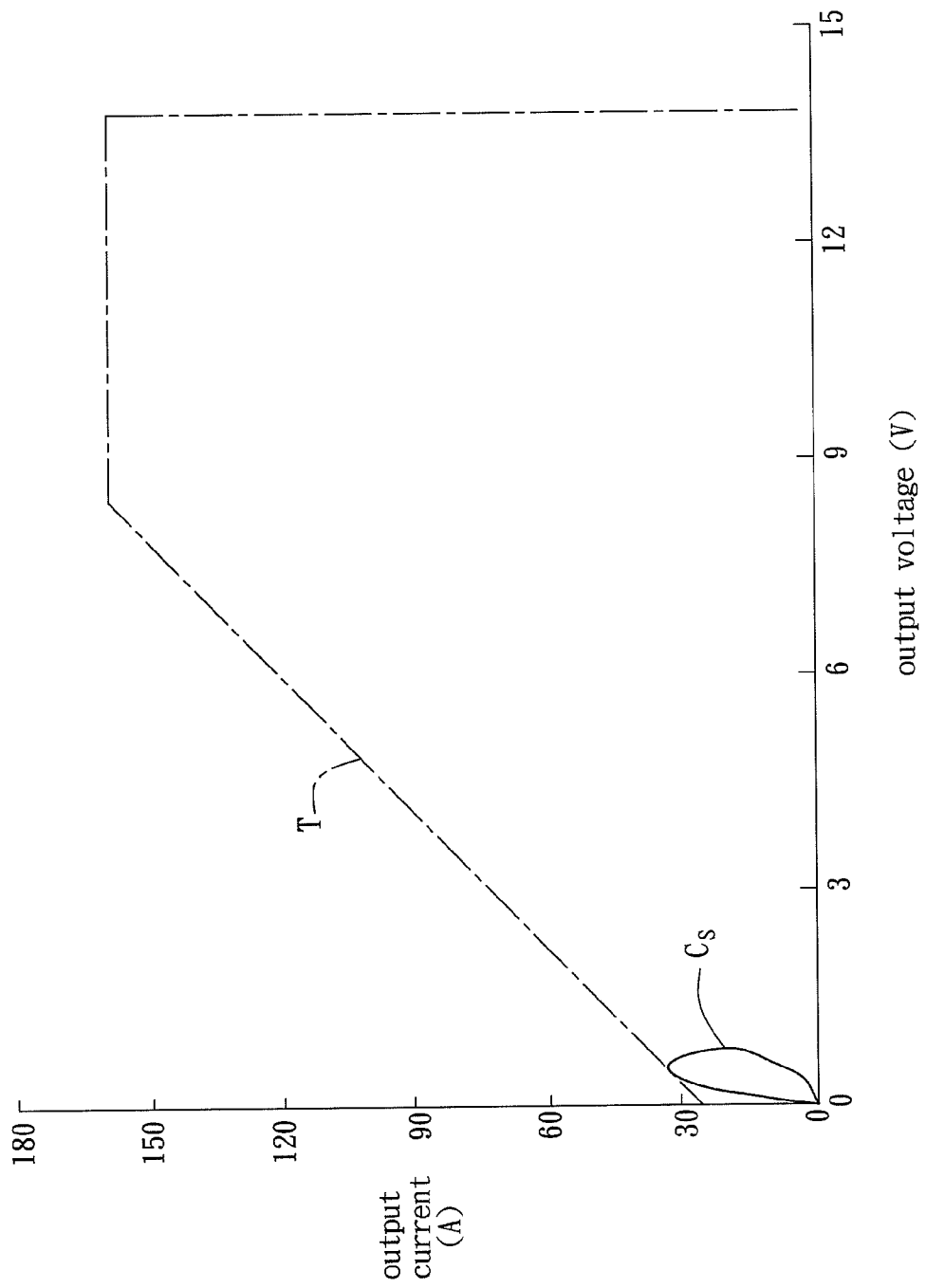
FIG. 5B is a schematic graph showing the waveform while the circuit protection device according to the embodiment of the invention is enabled.

For example, the power supply module 3 is a power supplier with a rated output voltage of 13.8V and a rated output current of 150 A, and FIG. 5B shows the waveform while the circuit protection device 5 is enabled. As shown in FIG. 5B, the circuit protection device 5 uses the second resistor $R_2$ and the resistor divider $R_3$ to divide the reference voltage source $V_{REF}$ received by the second resistor $R_2$ so as to determine the maximum value of the threshold T. In addition, the current limiter $D_2$ can decrease the voltage value of the voltage signal. Furthermore, it is possible to determine the slope of the threshold T according to the amplification of the second comparator $COM_2$ and the forward voltage of the current limiter $D_2$. Accordingly, the above-mentioned hardware structure can modulate the slope and maximum value of the threshold T, so that the circuit protection device 5 is more suitable for the capacitive load.

Figure 6:
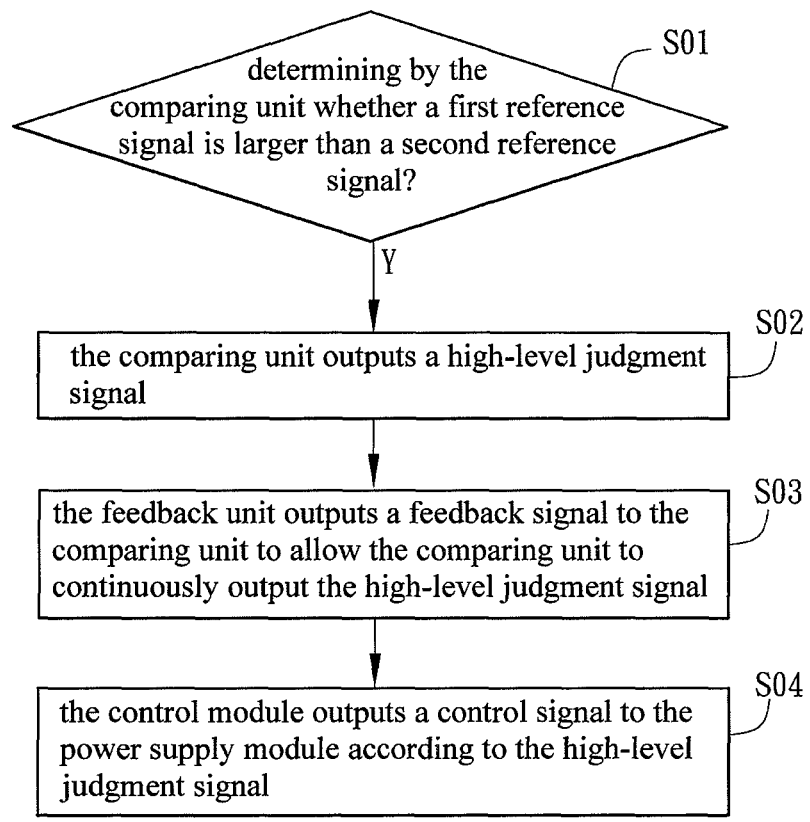
FIG. 6 is a flow chart of a protection method according to the embodiment of the invention.

The protection method according to the embodiment of the invention will be described hereinafter with reference to FIG. 6 in view of FIGS. 2 and 3A. The protection method is applied to the above-mentioned circuit protection device 2 and power supply module 3, and it includes the following steps S01 to S04.

In the step S01, the comparing unit 211 determines whether a first reference signal $REF_1$ is larger than a second reference signal $REF_2$. Herein, the first reference signal $REF_1$ represents the output current of the power supply module 3, and the second reference signal $REF_2$ represents the output voltage of the power supply module 3. In practice, the comparing unit 211 is a comparator, which has a non-inverting input terminal for receiving the first reference signal $REF_1$ and an inverting input terminal for receiving the second reference signal $REF_2$.

If the step S01 determines that the first reference signal $REF_1$ is larger than the second reference signal $REF_2$, the comparing unit 211 then outputs a high-level judgment signal $S_1$ (step S02). In practice, when the value of the first reference signal $REF_1$ is larger than that of the second reference signal $REF_2$, it means that the short circuit or over current happens. In this case, the comparing unit 211 outputs a high-level judgment signal $S_1$.

In the step S03, the feedback unit 212 outputs a feedback signal $S_2$ to the comparing unit 211 to allow the comparing unit 211 to continuously output the high-level judgment signal $S_1$. In practice, the feedback unit 212 simultaneously receives the high-level judgment signal $S_1$ from the comparing unit 211 and outputs the feedback signal $S_2$ to the first input terminal of the comparing unit 211, thereby forming a positive feedback. This allows the feedback unit 212 in a latch state so as to continuously output the high-level judgment signal $S_1$.

In the step S04, the control module 22 outputs a control signal $S_3$ to the power supply module 3 according to the high-level judgment signal $S_1$. In practice, the control module 22 outputs the control signal $S_3$ according to the high-level judgment signal $S_1$ from the comparing unit 211 for ceasing the operation of the power supply module 3. Since the protection function of the circuit protection device 2 is enabled based on detecting the relationship between the output current and output voltage of the power supply module 3, the circuit protection device 2 can detect out the short circuit and over current based on an inconstant threshold. Accordingly, the circuit protection device 2 can respond quickly to perform the desired protection.

In addition, the circuit protection device 2 further has the function of releasing the latch state. Accordingly, the protection method for the circuit protection device 2 further includes the following steps of: outputting a reset signal $S_4$ from the control module 22 to the reset unit 213; and outputting a low-level judgment signal $S_1$ by the comparing unit 211. In practice, the control module 22 can output the reset signal $S_4$ to the reset unit 213 according to a preset delay, thereby releasing the latch state.

Besides, if the comparing unit 211 determines that the first reference signal $REF_1$ is not larger than the second reference signal $REF_2$, it means that the short circuit or over current is not happened. In this case, the comparing unit 211 outputs a low-level judgment signal $S_1$, so that the power supply module 3 is normally operating. Simultaneously, the comparing unit 211 continuously determines whether the first reference signal $REF_1$ is larger than the second reference signal $REF_2$. In other words, the circuit protection device 2 can provide a real-time circuit protection.

To be noted, the protection method can also be applied to the above-mentioned circuit protection device 4 or 5. Since the steps of the protection method for the circuit protection device 4 or 5 is the same as that for the circuit protection device 2, so the detailed description thereof is omitted.

To sum up, in the circuit protection device of the invention, the comparing unit of the judgment module outputs a judgment signal according to the first reference signal representing the output current of the power supply module and a second reference signal representing the output voltage of the power supply module, and the feedback unit can maintain the protection state accordingly. This can decrease the threshold for enabling the protection function, so that the circuit protection device can fast respond to protect the power supply module, thereby minimizing the damage of the internal components and improving the reliability and utility.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A circuit protection device, which is applied to a power supply module, comprising:
    a judgment module comprising a comparing unit, a feedback unit and a reset unit, wherein the comparing unit has an output terminal, a first input terminal and a second input terminal, the feedback unit is electrically connected to the output terminal and the first input terminal, and the reset unit is electrically connected to the feedback unit and the first input terminal; and
    a control module electrically connected to the comparing unit and the reset unit of the judgment module;
    wherein, the comparing unit receives a first reference signal representing the output current of the power supply module and a second reference signal representing the output voltage of the power supply module, and outputs a judgment signal to the control module,
    wherein the circuit protection device is enabled based on detecting the relationship between the output current and output voltage of the power supply module, and a threshold for enabling the circuit protection device is a variable value.

2. The circuit protection device according to claim 1, wherein the comparing unit is a comparator, the first input terminal is a non-inverting input terminal, and the second input terminal is an inverting input terminal.

3. The circuit protection device according to claim 1, wherein the feedback unit comprises a diode and a resistor connected to each other in series.

4. The circuit protection device according to claim 3, wherein the judgment module further comprises:
    a first resistor electrically connected to the first input terminal of the comparing unit; and a second resistor electrically connected to the second input terminal of the comparing unit.

5. The circuit protection device according to claim 4, wherein the resistance value of the resistor of the feedback unit is smaller than that of the first resistor.

6. The circuit protection device according to claim 1, further comprising:
   a reference signal generating module for outputting the first reference signal and the second reference signal to the comparing unit of the judgment module.

7. The circuit protection device according to claim 6, wherein the reference signal generating module further comprising:
   a first comparing circuit comprising a first comparator, wherein the first comparing circuit is electrically connected to the first input terminal of the comparing unit and outputs the first reference signal; and
   a second comparing circuit comprising a second comparator, wherein the second comparing circuit is electrically connected to the second input terminal of the comparing unit and outputs the second reference signal.

8. The circuit protection device according to claim 7, wherein the second comparing circuit further comprising:
   a current limiter having one end electrically connected to the second comparator; and
   a resistor divider having one end electrically connected to the other end of the current limiter and the second input terminal of the comparing unit, wherein the other end of the resistor divider is grounded.

9. The circuit protection device according to claim 1, wherein the reset unit has a first terminal electrically connected to the feedback unit and the first input terminal, a second terminal electrically connected to the control module, and a third terminal, wherein the third terminal is grounded.

10. The circuit protection device according to claim 1, wherein the control module outputs a control signal to the power supply module according to the judgment signal.

11. The circuit protection device according to claim 1, wherein the control module outputs a reset signal to the reset unit.

12. A protection method applied to a circuit protection device and a power supply module, wherein the circuit protection device comprises a judgment module and a control module, and the judgment module comprises a comparing unit, a feedback unit and a reset unit, the protection method comprising the steps of:
   determining whether a first reference signal is larger than a second reference signal by the comparing unit, wherein the first reference signal represents the output current of the power supply module, and the second reference signal represents the output voltage of the power supply module;
   if the comparing unit determines that the first reference signal is larger than the second reference signal, outputting a high-level judgment signal by the comparing unit;
   outputting a feedback signal from the feedback unit to the comparing unit to allow the comparing unit to continuously output the high-level judgment signal; and
   outputting a control signal from the control module to the power supply module according to the high-level judgment signal,
   wherein the circuit protection device is enabled based on detecting the relationship between the output current and output voltage of the power supply module, and a threshold for enabling the circuit protection device is a variable value.

13. The protection method according to claim 12, further comprising the steps of:
   if the comparing unit determines that the first reference signal is not larger than the second reference signal, outputting a low-level judgment signal by the comparing unit; and
   determining again whether the first reference signal is larger than the second reference signal by the comparing unit.

14. The protection method according to claim 12, further comprising the steps of:
   outputting a reset signal from the control module to the reset unit; and
   outputting a low-level judgment signal by the comparing unit.

* * * * *